UNITED STATES PATENT OFFICE.

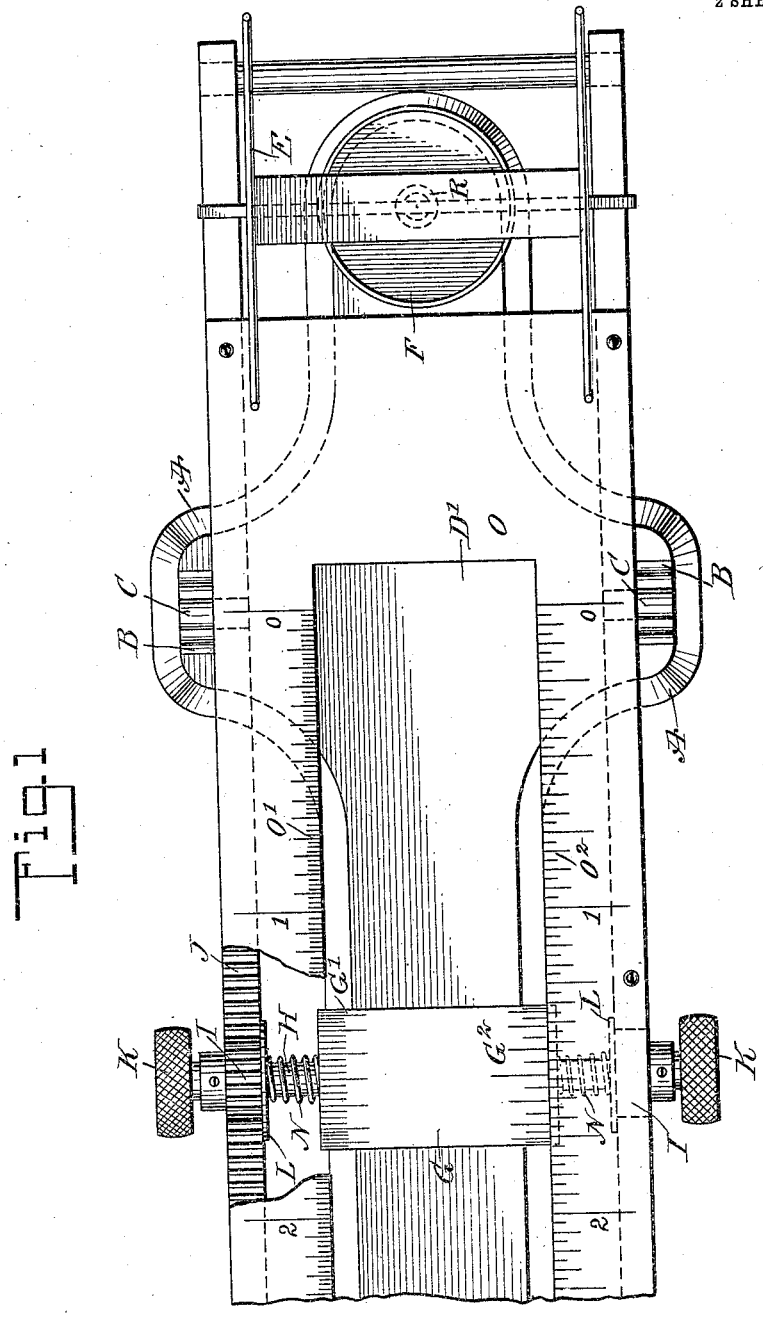

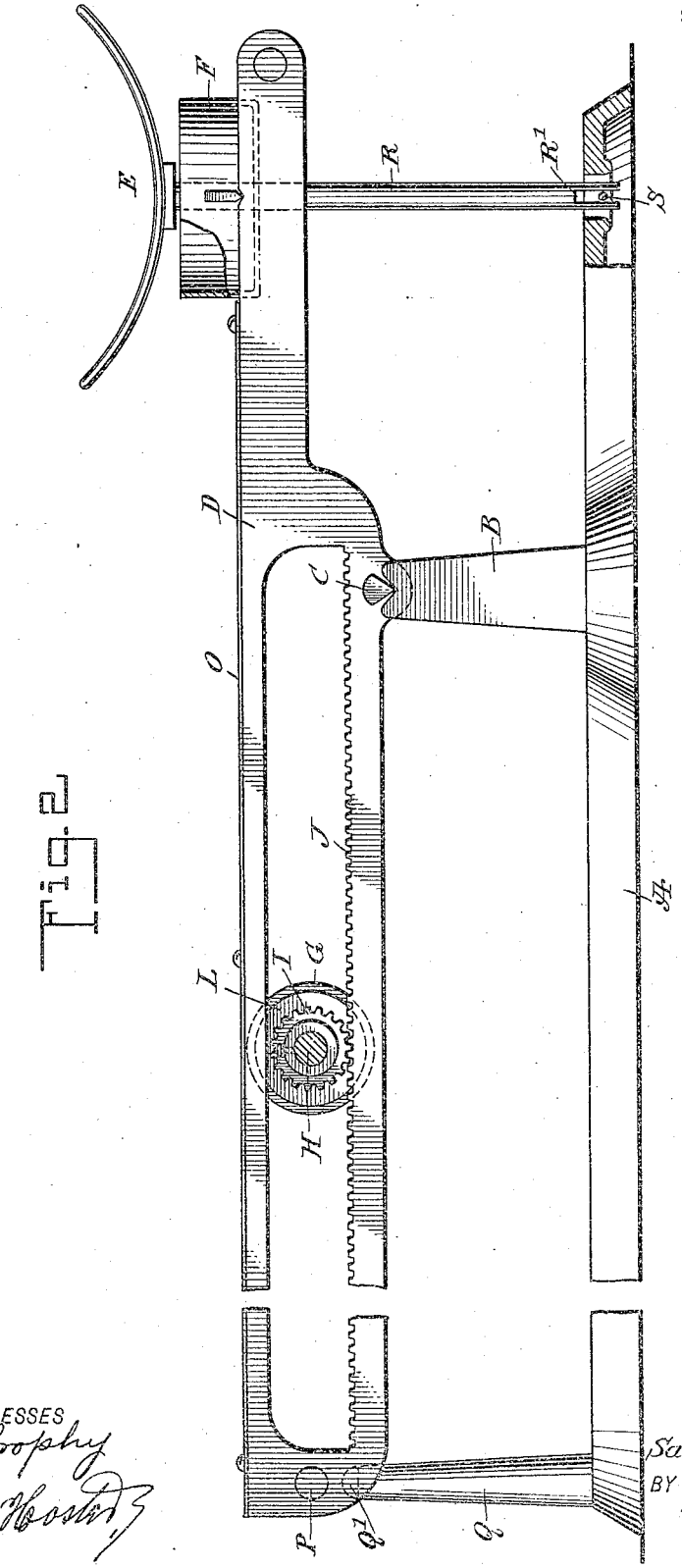

SAMUEL CLAYTON COOPER, OF NUNDA, NEW YORK.

SCALE.

939,809.

Specification of Letters Patent.

Patented Nov. 9, 1909.

Application filed February 25, 1908. Serial No. 417,662.

*To all whom it may concern:*

Be it known that I, SAMUEL C. COOPER, a citizen of the United States, and a resident of Nunda, in the county of Livingston and State of New York, have invented a new and Improved Scale, of which the following is a full, clear, and exact description.

The invention relates to measuring instruments, and its object is to provide a new and improved weighing scale, arranged to permit the minute adjustment of the poise to insure accurate weighing and to allow convenient reading of the result.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1 is a plan view of the improvement, part being broken out, and Fig. 2 is a side elevation of the same, parts being broken out.

On the base A of the weighing scale are arranged bearings B engaged by the knife edges of the pivot pin C, secured on the beam D, adapted to carry at one end the load by the use of a suitable support, such as a pan, scoop, platform or the like, held on a frame E mounted on the beam and provided with a receptacle F for containing weights employed for truing the scale.

The poise G for the beam D is made in the form of a cylinder, having its horizontal axis disposed transversely of the beam and the said poise G is adapted to roll lengthwise of the beam, to bring the latter into equilibrium when weighing. For the purpose mentioned the poise G is secured on a shaft H, provided with pinions I in mesh with racks J, secured to or formed on the beam D a distance below the top thereof, as plainly indicated in Fig. 2. The outer ends of the shaft H are provided with knobs or handles K, adapted to be taken hold of by the operator, for turning the shaft H, the pinions I and the poise G, with a view to roll the poise G along on the beam D, nearer to or farther from the pivot pin C, according to the load supported on the frame E, to bring the beam D finally into equilibrium. It is understood that by having the pinions I in mesh with the racks J, a positive forward or backward rolling of the poise G is had, to enable the operator to quickly and conveniently bring the beam D into equilibrium.

On the shaft H are arranged washers L, pressed on by springs N coiled on the shaft H, between the washers L and the corresponding ends of the poise G, the said washers pressing against the inner faces of the racks J and the upper portion of the beam D, so as to hold the poise G in the adjusted position by the frictional contact of the washers with the racks J and the upper portion of the beam D. The poise G is provided at its peripheral face and at or near each end with scales G', G², the top marks of which are adapted to register with corresponding marks on scales O', O², preferably formed on a plate O, secured to the top of the beam D. The scale O' is divided to represent pounds and subdivisions in quarter ounces, and the scale O² is divided to represent pounds and half ounces, and the graduations G' and G² are similarly arranged to represent quarter and half ounces. Owing to the fact that the poise G is of greater diameter than the gear wheel I, the circumference of the poise is greater than the distance, which the poise travels in a complete rotation and consequently it is necessary that the graduations of the scale of the poise be spaced farther apart than the graduations of the scale of the beam. The circumference of the poise is such that when it makes one complete revolution it will have traveled a distance of a unit graduation of the scale beam, that is, the poise G makes one complete revolution from one pound mark to the other. Thus by the arrangement described, the graduation marks G', G² on the poise G at all times correspond to the graduation marks of the subdivisions on the scales O', O². As shown in Fig. 1, the beam D is provided with an opening D', through which the poise G is visible from above, to allow the operator to conveniently read the result on either of the scales O' or O².

The free end of the beam D is provided with a transverse bar P adapted to rest on the cushion top Q' of a base Q erected on the base A, to limit the downward swinging motion of the free end of the beam D. The frame E is provided with a downwardly-extending rod R, having its lower slotted end R' straddling a pin S attached to the base A, so as to limit the downward swinging motion of the load end of the beam.

From the foregoing it will be seen that the operator, on taking hold of either handle K, can conveniently and readily roll the cylindrical poise G lengthwise along the beam D, to bring the latter into equilibrium, the operator being enabled to quickly and conveniently read the result on the registering graduation marks of the scales G', G², O', O².

Having thus described my invention, I claim as new and desire to secure by Letters Patent:

1. A weighing scale provided with a graduated beam and a cylindrical poise mounted to roll along a portion of the said beam different from that having the graduations and provided on its peripheral face with graduation marks for reading on the graduation marks of the said beam, and means for rolling the poise lengthwise of the beam.

2. A weighing scale provided with a beam supporting the load at one side of its fulcrum and having the other provided with a scale, racks extending longitudinally on the graduated end of the beam, a cylindrical poise having a scale on its peripheral face for register with the said beam scale, and pinions on the said poise and in mesh with the said racks.

3. A weighing scale provided with a beam supporting the load at one side of its fulcrum and having the other provided with a scale, racks extending longitudinally on the graduated end of the beam, a cylindrical poise having a scale on its peripheral face for register with the said beam scale, pinions on the said poise and in mesh with the said racks, and a friction device for holding the poise and its pinions in the adjusted position.

4. A weighing scale provided with a beam supporting the load at one side of its fulcrum and having the other provided with a scale, racks extending longitudinally on the graduated end of the beam, a cylindrical poise having a scale on its peripheral face for register with the said beam scale, a shaft on the poise, and pinions secured on the said shaft and in mesh with the said racks.

5. A weighing scale provided with a beam supporting the load at one side of its fulcrum and having the other provided with a scale, racks extending longitudinally on the graduated end of the beam, a cylindrical poise having a scale on its peripheral face for register with the said beam scale, a shaft on the poise, pinions secured on the said shaft and in mesh with the said racks, springs coiled on the said shaft, and washers bearing against the racks and pressed on by the said springs.

6. A weighing scale having a beam provided with a scale representing a unit weight and sub-divisions thereof, and a cylindrical poise mounted to roll lengthwise of the beam, said poise having a reduced portion engaging the beam and provided with a scale, the sub-divisions of which are similar to but are spaced farther apart than the subdivisions of the scale beam, whereby when the poise makes a complete revolution it will have traveled a distance of a unit graduation of the scale beam.

7. A weighing scale having a beam provided with two graduated portions spaced apart and arranged in the same horizontal plane, of which one is divided into pounds and subdivisions of half ounces, and the other divided into pounds and subdivisions of quarter ounces, and a cylindrical poise mounted to roll on the said beam with its peripheral face below the beam and provided with two graduated portions corresponding to the graduations of the beam.

8. A weighing scale provided with a beam having a scale thereon, and a cylindrical poise mounted to roll along the beam with its periphery below and adjacent to the scale of the beam and provided on its peripheral face with a scale the top marks of which are adapted to register with corresponding marks of the scale of said beam.

9. A weighing scale provided with a beam having a scale thereon and provided with longitudinally extending members below the upper face of the beam, and a cylindrical poise provided with a scale on its periphery and mounted to roll on said members with its scale adjacent to the scale of the beam.

10. A weighing scale provided with a beam having two scales thereon and provided with longitudinal members below the upper face of the beam, and a cylindrical poise provided on its periphery at each end with a scale and mounted to roll on said members with its scales adjacent to the scales of the beams.

In testimony whereof I have signed my name to this specification in the presence of two subscribing witnesses.

SAMUEL CLAYTON COOPER.

Witnesses:
 JOSEPH LOVELL,
 ROBERT W. LOVELL.